(12) United States Patent
Pavlik et al.

(10) Patent No.: US 7,228,455 B2
(45) Date of Patent: Jun. 5, 2007

(54) TRANSACTION BRANCH MANAGEMENT TO ENSURE MAXIMUM BRANCH COMPLETION IN THE FACE OF FAILURE

(75) Inventors: Greg Pavlik, Shamong, NJ (US); Peter H. Petersen, Trenton, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 617 days.

(21) Appl. No.: 10/434,099

(22) Filed: May 9, 2003

(65) Prior Publication Data

US 2004/0236990 A1    Nov. 25, 2004

(51) Int. Cl.
*G06F 11/00*    (2006.01)
(52) U.S. Cl. .............................. 714/15; 714/4; 714/18
(58) Field of Classification Search ................. 714/4, 714/15, 18
See application file for complete search history.

(56) References Cited

U.S. PATENT DOCUMENTS 5,790,789 A * 8/1998 Suarez .................... 709/202
6,052,695 A * 4/2000 Abe et al. ................ 714/15
6,865,592 B1 * 3/2005 Shindo .................... 714/4
6,895,529 B2 * 5/2005 Egolf et al. .............. 714/15
6,961,865 B1 * 11/2005 Ganesh et al. ........... 714/15

* cited by examiner

*Primary Examiner*—Robert Beausoliel
*Assistant Examiner*—Joseph D Manoskey
(74) *Attorney, Agent, or Firm*—Bingham McCutchen LLP

(57) ABSTRACT

A method, system, and computer program product provides automatic and consistent resolution of in doubt branches of a transaction, and which will provide reduced cost of operating the system and improved overall performance of the system. A method of managing transaction branches comprises the steps of beginning execution of a transaction, storing information relating to branches of the transaction in a data structure, iterating over the data structure to identify branches of the transaction that are eligible for an action, executing a first action for at least some branches of the transaction identified as eligible for an action, and changing a state of the transaction and applying a second action to branches of the transaction, if the first action returns an error.

36 Claims, 6 Drawing Sheets

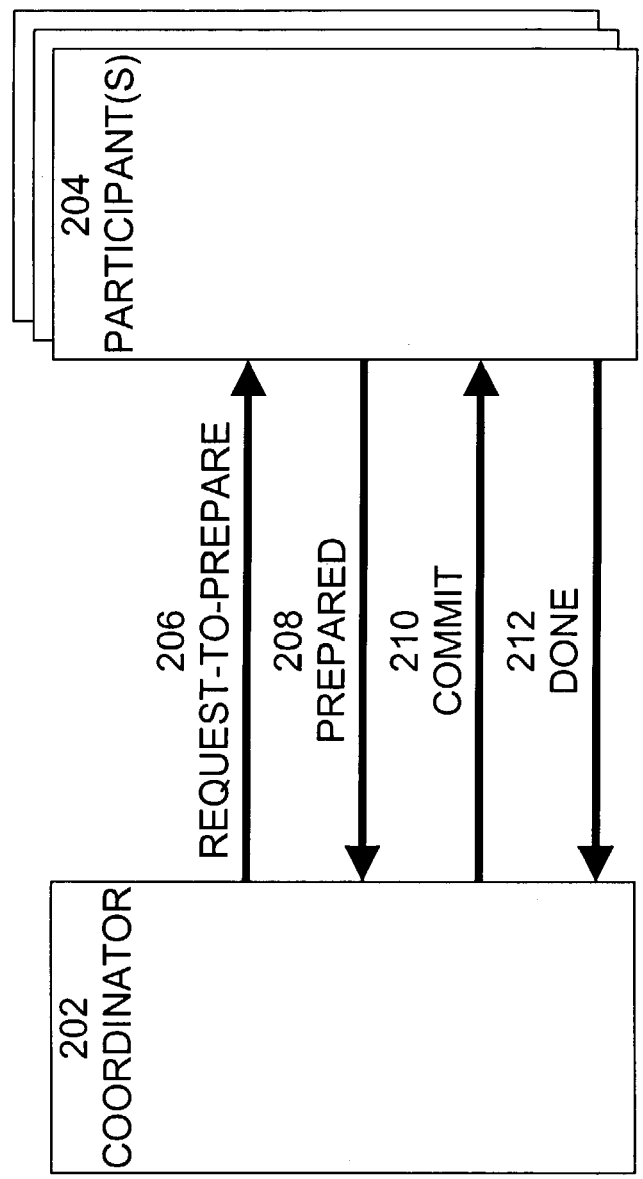

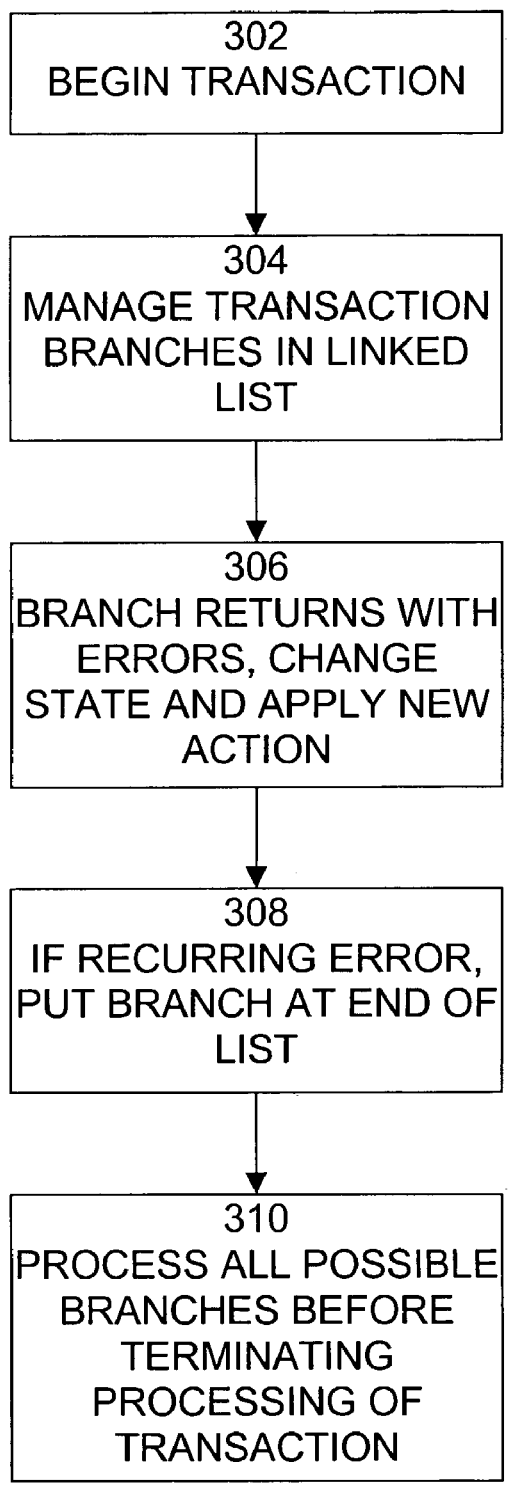

TRANSACTION BRANCH MANAGEMENT TO ENSURE MAXIMUM BRANCH COMPLETION IN THE FACE OF FAILURE

FIELD OF THE INVENTION

The present invention relates to managing branches of transactions using a data structure to provide maximum branch completion even when failures occur.

BACKGROUND OF THE INVENTION

Distributed systems have become a standard architecture for the implementation of databases, Web servers, application servers, etc. Accesses that are made to the data stored in such systems are known as transactions. Transactions that modify data stored in server systems present certain challenges in the operations of a distributed server system. In particular, decisions with respect to modifications to data must be propagated to all necessary locations in the distributed server system in order to ensure that all portions of the system contain consistent data.

Global or Distributed Transactions involve the coordination of data changes to multiple resource managers. Global Transactions use a completion protocol to guarantee data consistency among multiple systems. The "standard" protocol used to achieve consistency is the two phase commit protocol, which requires a coordinator to contact all resource managers involved in a transaction during a voting phase. The voting phase allows the resource managers to affirm that they are able to commit the changes made in the scope of the transaction permanently. If all resource managers respond affirmatively, the coordinator contacts them again in the second phase and instructs them to commit their changes. Had one resource manager voted against the commit, the coordinator would terminate the first phase of communication and require all resource managers to roll back the work scope by the transaction. Each resource manager is typically managed by the coordinator as a "branch" of the transaction.

In between the first and second phase of the completion protocol, the resource managers are each uncertain as to the outcome of the transaction. At this point, the resource managers are said to remain "in doubt", a term used to describe an indefinite state for a resource manager. This state may be resolved in the second phase of the completion protocol. Occasionally, resolution of in doubt branches must be performed via manual intervention by an administrator, who often has insufficient information to resolve the branch properly (consistently). Due to the lack of information, this "heuristic" resolution of in doubt branches is an error prone way to resolve such branches and may result in reduced data availability. A need arises for a technique that will provide automatic and consistent resolution of both active and in doubt branches of a transaction, and which will provide reduced cost of operating the system and improved overall data availability and performance of the system.

SUMMARY OF THE INVENTION

The present invention provides automatic and consistent resolution of both active and in doubt branches of a transaction, and which will provide reduced cost of operating the system and improved overall data availability and performance of the system.

In one embodiment of the present invention, a method of managing transaction branches comprises the steps of beginning execution of a transaction on behalf of an application, storing information relating to branches of the transaction in a data structure, iterating over the data structure to identify branches of the transaction that are eligible for an action, executing a first action for at least some branches of the transaction identified as eligible for an action, and changing a state of the transaction and applying a second action to branches of the transaction, if the first action returns an error.

The transaction may be executed using a two-phase transaction protocol. The step of storing information relating to branches of the transaction may comprise the step of inserting at least one entry in the data structure, the entry including information relating to a branch of the transaction. The method may further comprise the step of modifying the data structure, if the first action recurrently returns an error in a branch of the transaction. The step of modifying the data structure may comprise the step of reordering entries in the data structure so that serial execution is altered in a current or in a later iteration. The method may further comprise the step of terminating processing of the transaction on behalf of the application, if all remaining branches in the linked list are branches on which no further progress can be made. The data structure may comprise a list, an array, a vector, or a hash set.

BRIEF DESCRIPTION OF THE DRAWINGS

The details of the present invention, both as to its structure and operation, can best be understood by referring to the accompanying drawings, in which like reference numbers and designations refer to like elements.

FIG. 2a is an exemplary data flow diagram of a two-phase commit protocol.

FIG. 3 is an exemplary flow diagram of a process of transaction branch management, according to the present invention.

DETAILED DESCRIPTION OF THE INVENTION

Figure 1:
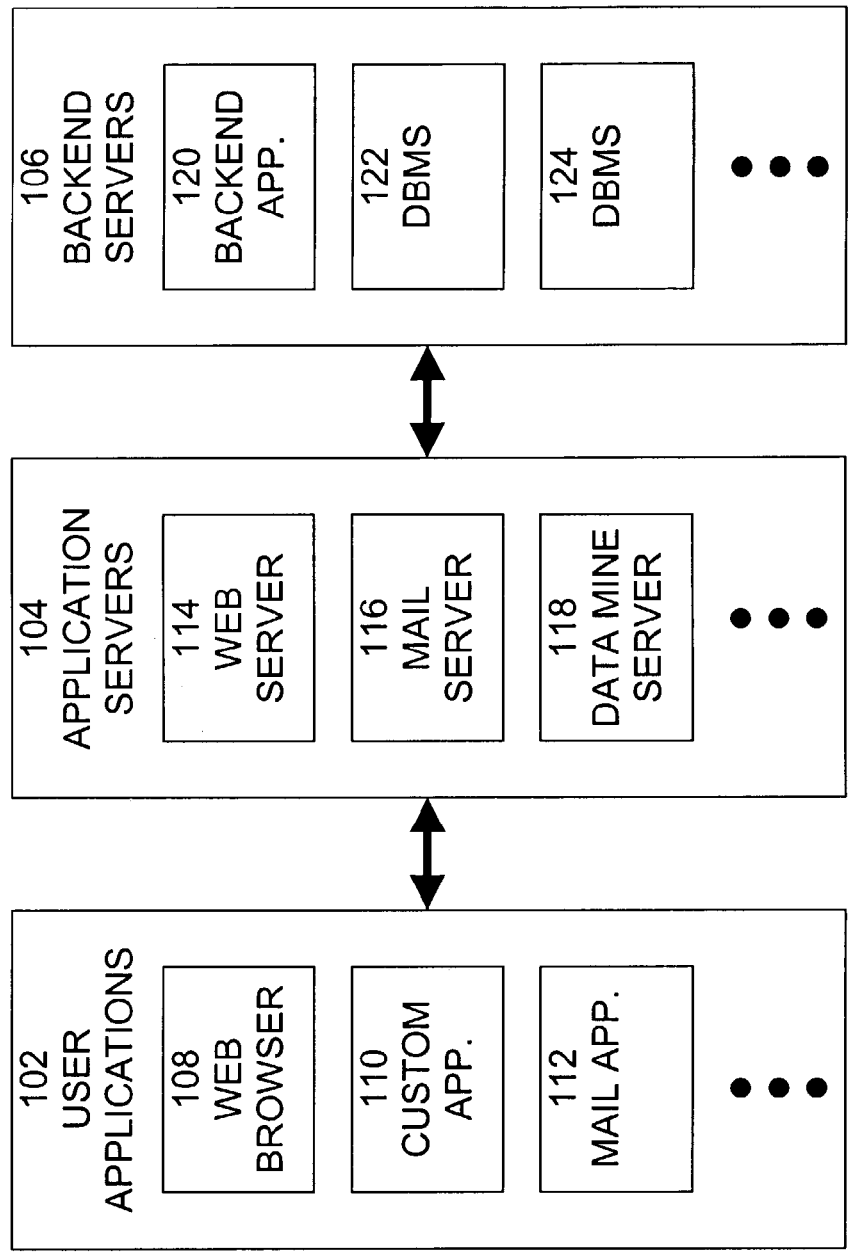
FIG. 1 is an exemplary block diagram of a system architecture, in which the present invention may be implemented.

An exemplary system architecture 100, in which the present invention may be implemented, is shown in FIG. 1. System 100 includes user applications 102, application servers 104, and backend servers 106. User applications 102 include a plurality of applications that are operated by or interface with a user, such as web browser 108, custom application 110, and mail application 112. Application servers 104 include a plurality of servers that handle application operations between user applications 102 and backend servers 106, such as web server 114, mail server 116, and data mining server 118. Application servers are typically used for complex transaction-based applications. To support high-end needs, an application server should have built-in redundancy, monitors for high-availability, high-performance distributed application services and support for complex database access. Examples of types of servers that may be included in application servers 104 include:

Audio/Video Servers: Audio/Video servers bring multimedia capabilities to Web sites by enabling them to broadcast streaming multimedia content.

Chat Servers: Chat servers enable a large number of users to exchange information in an environment similar to Internet newsgroups that offer real-time discussion capabilities.

Fax Servers: A fax server is an ideal solution for organizations looking to reduce incoming and outgoing telephone resources but that need to fax actual documents.

FTP Servers: One of the oldest of the Internet services, File Transfer Protocol makes it possible to move one or more files securely between computers while providing file security and organization as well as transfer control.

Groupware Servers: A groupware server is software designed to enable users to collaborate, regardless of location, via the Internet or a corporate intranet and to work together in a virtual atmosphere.

IRC Servers: An option for those seeking real-time discussion capabilities, Internet Relay Chat consists of various separate networks (or "nets") of servers that allow users to connect to each other via an IRC network.

List Servers: List servers offer a way to better manage mailing lists, whether they be interactive discussions open to the public or one-way lists that deliver announcements, newsletters, or advertising.

Mail Servers: Almost as ubiquitous and crucial as Web servers, mail servers move and store mail over corporate networks (via LANs and WANs) and across the Internet.

News Servers: News servers act as a distribution and delivery source for the thousands of public news groups currently accessible over the USENET news network.

Proxy Servers: Proxy servers sit between a client program (typically a Web browser) and an external server (typically another server on the Web) to filter requests, improve performance, and share connections.

Telnet Servers: A Telnet server enables users to log on to a host computer and perform tasks as if they're working on the remote computer itself.

Web Servers: At its core, a Web server serves static content to a Web browser by loading a file from a disk and serving it across the network to a user's Web browser. This entire exchange is mediated by the browser and server talking to each other using HTTP.

Backend servers 106 include a plurality of servers, such as backend business application 120 and database management systems 122 and 124. Database management systems (DBMSs) are software that enables storing, modifying, and extracting information from a database. There are many different types of DBMSs, ranging from small systems that run on personal computers to huge systems that run on mainframes. Examples of database applications include:

computerized library systems automated teller machines flight reservation systems computerized parts inventory systems From a technical standpoint, DBMSs can differ widely. The terms relational, network, flat, and hierarchical all refer to the way a DBMS organizes information internally. The internal organization can affect how quickly and flexibly you can extract information.

The precise architecture of any particular application server depends upon a variety of factors, such as its overall function, expected load, required availability, and other usage, business, financial, and engineering factors. Application servers typically have web servers for static or dynamic content; distributed object request brokers (ORBs), transaction managers, data caches and resource adapters that allow the application server to communicate with transactional resource managers (databases, message queues, etc). While these components may be integrated into an application server, they are generally not related to transaction processing. For example, the web server may in fact be used for Simple Object Access Protocol (SOAP) processing and act as a transport for distributed transaction context propagation; the ORB infrastructure may do the same.

Figure 2B:
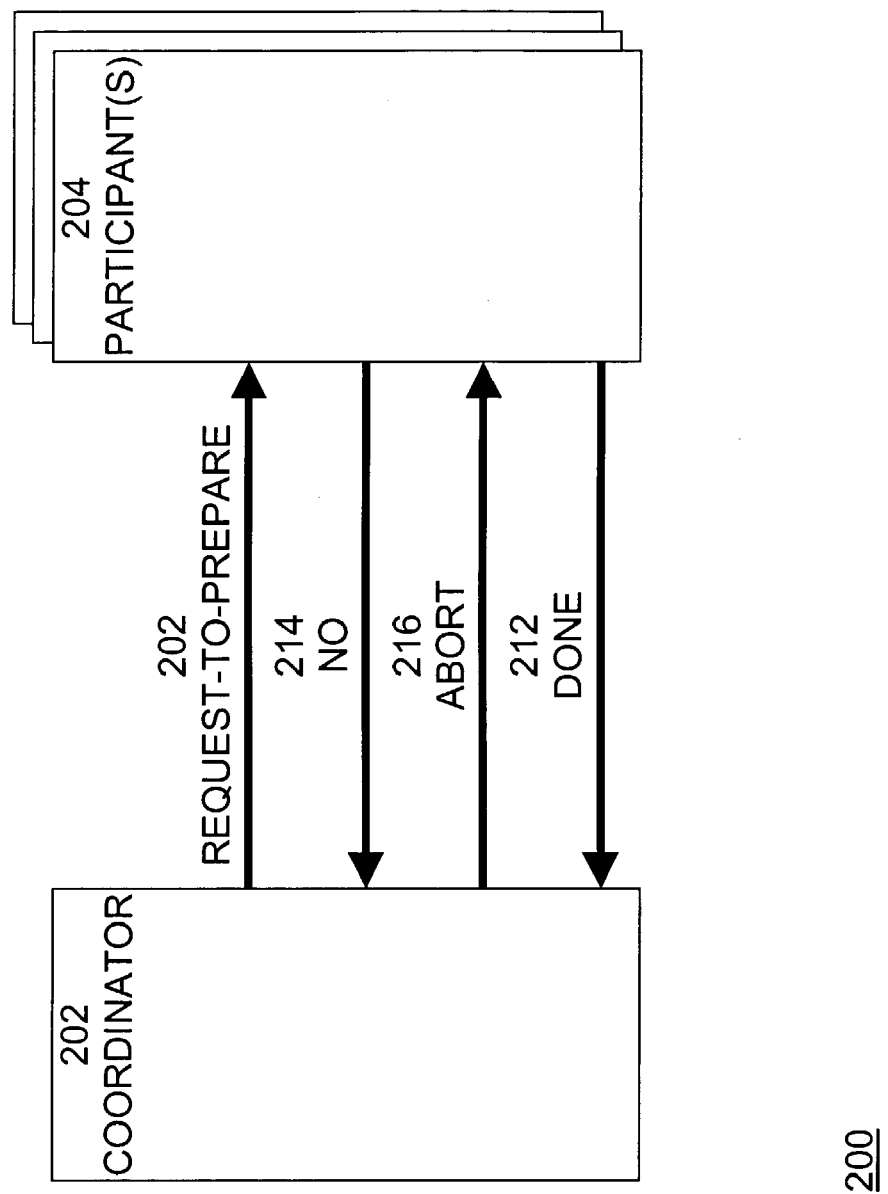
FIG. 2b is an exemplary data flow diagram of a two-phase commit protocol.
Figure 4:
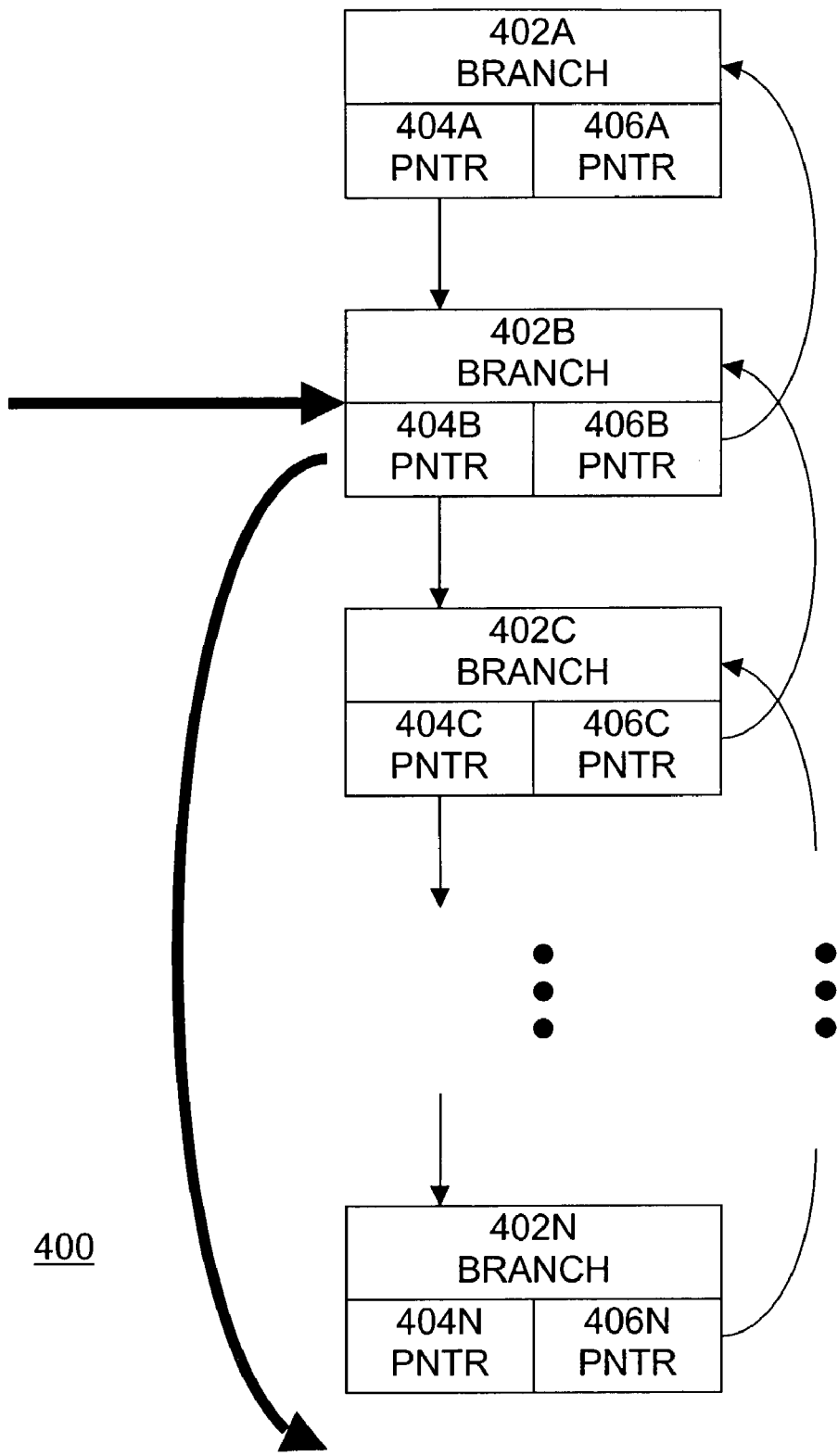
FIG. 4 is an exemplary block diagram of a linked list data structure used by the process shown in FIG. 3.

An exemplary data flow diagram of a two-phase commit protocol 200 is shown in FIGS. 2a and 2b. FIG. 2a illustrates operation of the protocol in the situation in which the transaction commits. FIG. 2b illustrates operation of the protocol in the situation in which the transaction aborts. FIGS. 2a and 2b are best viewed in conjunction. In protocol 200, messages are communicated between a coordinator 202 and one or more participants 204. Coordinator 202 is the component that runs the two-phase commit protocol on behalf of one transaction, that is, the coordinator is the component that receives the commit or abort request and drives the execution of the protocol. Participants 204 are resource managers that do work on behalf of the transaction, for example, by reading and updating resources. The goal is to ensure that the coordinator and all participants commit the transaction, as shown in FIG. 2, or the coordinator and all participants abort the transaction, as shown in FIG. 4.

A resource manager is a term used to describe the role of system components that manage the operation of resources, such as DBMSs. A resource is a term used to describe an item that is managed by a resource manager, such as a database managed by a DBMS. The terms "resource manage" and "resource," are used to broaden the description of the system components that are used in the two-phase commit protocol because, when a transaction commits, all of the shared resources it accesses need to get involved in the commitment activity, not just databases. Nondatabase resources include recoverable scratch pad areas, queues, and other communications systems.

The two-phase commit protocol makes the following assumptions about each transaction T:

1. Transaction T accesses resources from time to time. If it experiences a serious error at any time, such as a deadlock or illegal operation, it issues an abort operation. If it terminates normally without any errors, it issues a commit. In response to the commit, the system runs the two-phase commit protocol.

2. Each resource manager can commit or abort its part of T, that is, permanently install or undo T's operations that involve this resource manager. Thus, each resource manager typically has a transactional recovery system.

3. One and only one program issues the commit operation on T. That is, one program decides when to start committing T by running the two-phase commit protocol, and no other program will later start running the protocol on T independently. In some cases, a second attempt to run two-phase commit while the first attempt is still running will cause the protocol to break, that is, will cause it to commit at one resource manager and abort at another. The protocol can be programmed to cope with concurrent attempts to run two-phase commit, but we assume it does not happen.

4. Transaction T has terminated executing at all resource managers before issuing the commit operation. In general, this can be hard to arrange. If the transaction does all of its communications using RPC, then it can ensure T has finished processing at all resource managers by waiting for all of those calls to return, provided that each resource manager finishes all of the work it was asked to do before returning from the call. If T uses other communications paradigms, such as peer-to-peer, then it has to ensure by some other means that T terminated. For example, the well-known LU6.2 protocol, carefully dovetails two-phase commit with the transaction termination protocol. This assumption allows us to avoid dealing with the complexity of transaction termination here.

5. Every system and resource manager fails by stopping. That is, the protocol does not make mistakes when its system or a resource manager mal-functions. It either does exactly what the protocol says it should do, or it stops running. It is possible for a failure to cause the protocol to do something that is inconsistent with the specification, such as sending bogus messages.

Being Prepared

A participant P is said to be prepared if all of transaction T's after-images at P are in stable storage. It is essential that T does not commit at any participant until all participants are prepared. The reason is the force-at-commit rule, which says not to commit a transaction until the after-images of all of its updates are in stable storage. To see what goes wrong if you break the rule, suppose one participant, P1, commits T before another participant, P2, is pre-pared. If P2 subsequently fails, before it is prepared and after P1 commits, then T will not be atomic. T has already committed at P1, and it cannot commit at P2 because P2, may have lost some of T's updates when it failed. On the other hand, if P2 is prepared before P, commits, then it is still possible for T to be atomic after P2 fails. When P2 recovers, it still has T's updates in stable storage (because it was prepared before it failed). After it recovers and finds out that T committed, it too can finish committing T.

Ensuring that all participants are prepared before any of them commits is the essence of two-phase commit. Phase 1 is when all participants become prepared. Phase 2 is when they commit. No participant enters phase 2 until all participants have completed phase 1, that is, until all participants are prepared.

The Protocol

The protocol proceeds as follows

1. Begin phase 1: To commit the transaction, the coordinator 202 starts by sending a REQUEST-TO-PREPARE message 206 to each participant 204.
2. The coordinator 202 waits for all participants 204 to "vote" on the request.
3. In response to receiving a REQUEST-TO-PREPARE message 206, each participant 204 votes by sending a message back to the coordinator, as follows:
   a. It votes PREPARED by sending a PREPARED message 208 if it is prepared to commit.
   b. It may vote NO by sending a NO message 214 for any reason, usually because it cannot prepare the transaction due to a local failure.
   c. It may delay voting indefinitely, usually because its system is overburdened with other work.
4. Begin phase 2: If the coordinator 202 receives PREPARED messages 208 from all participants 204, it decides to commit. The transaction is now officially committed. Otherwise, it either received at least one NO message 214 or gave up waiting for some participant, so it decides to abort.
5. The coordinator 202 sends its decision to all participants 204 using COMMIT messages 210 or ABORT messages 216.
6. Participants 204 acknowledge receipt of the COMMIT messages 210 or ABORT messages 216 by replying with DONE messages 212.
7. After receiving DONE messages 212 from all participants 204, the coordinator 202 can forget the transaction, mean that it can deallocate any memory it was using to keep track of information about the transaction.

An exemplary flow diagram of a process 300 of transaction branch management, according to the present invention, is shown in FIG. 3. It is to be noted that process 300 utilizes at least one data structure in which information relating to the transactions being managed is stored. This data structure may be of any form or format that allows serial, ordered iteration to be performed upon it by process 300. Examples of suitable data structures include a list of any sort, an array, a vector, a hash set, etc.

For clarity, process 300 is described as utilizing a linked list data structure, such as that shown in FIG. 4. The linked list data structure shown in FIG. 4 is merely an example of a suitable data structure. The present invention contemplates any and all suitable data structures.

Process 300 is best viewed in conjunction with FIG. 4. Process 300 begins with step 302, in which a transaction, preferably using the two-phase transaction protocol, begins execution by a server process. Typically, such transaction execution is initiated on behalf of an application that desires to perform a transaction. In step 304, transaction branches are managed using linked list data structure 400, shown in FIG. 4. In order to manage a transaction branch, information relating to the transaction branch is inserted into linked list 400. For example, list 400 includes a plurality of entries 402A–N. Each entry includes branch information, such as branch information 402B, and one or more pointers to other entries in list 400, such as pointer 404B and pointer 406B. Once an entry including information relating to the transaction branch is inserted into linked list 400, list 400 is repeatedly iterated over to identify branches that are eligible for an action ("prepare", "commit", etc.). When a branch is identified as eligible for an action, that action may then be executed.

In step 306, when a branch returns from an action with certain expected errors, the global state of the transaction may be changed and a new action applied to the list of branches. For example, if the coordinator has not arrived at a decision, the global state of the transaction is the "preparing" state. If there are errors, the global state of the transaction is transitioned to the "rollingback" state and the reordering of branches in step 308 is performed. Alternatively, if the coordinator has arrived at a decision, either to commit or rollback, then the global state cannot change. However, the reordering of branches in step 308 is still performed to ensure as much progress as possible is made in processing the transaction. In step 308, in the event that the coordinator finds a recurring error in the branch that originally failed, the branches included in the data structure are reordered in such a way that serial execution is altered in the current or in a later iteration (the latter assumes a state transition of the global transaction) over the contents of the data structure. This doesn't imply a "second phase" in the voting process; a transition to rollback is allowed at any time other than after a commit decision has been made by the coordinator.

For example, using list 400 as the data structure, the branch is removed from the list and reinserted at the end of the list. To illustrate, if branch 402B is found to have recurring errors, it is removed from its location in list 400 and reinserted at the end of list 400. That way, progress can be made on as many branches as possible before encountering the recurring error. If the transaction were terminated as soon as an error was encountered, branches of the transaction, which could otherwise have been resolved, may be left in an undesirable state, in doubt or active. This can hold up resources for a potentially unlimited time. Instead, the present invention provides the advantage that the branch management strategy maximizes the resolution of branches for transactions that cannot be fully completed.

In step 310, all possible branches are processed before the transaction is terminated. That is, the transaction continues execution as long as branches on which progress is being made are present in list 400. Further processing of the transaction on behalf of the application is terminated only if all remaining branches in list 400 are branches on which no further progress can be made (or if all branches have successfully completed). Typically, the transaction itself still needs to be resolved through some kind of recovery mechanism that the application is unaware of.

Figure 5:
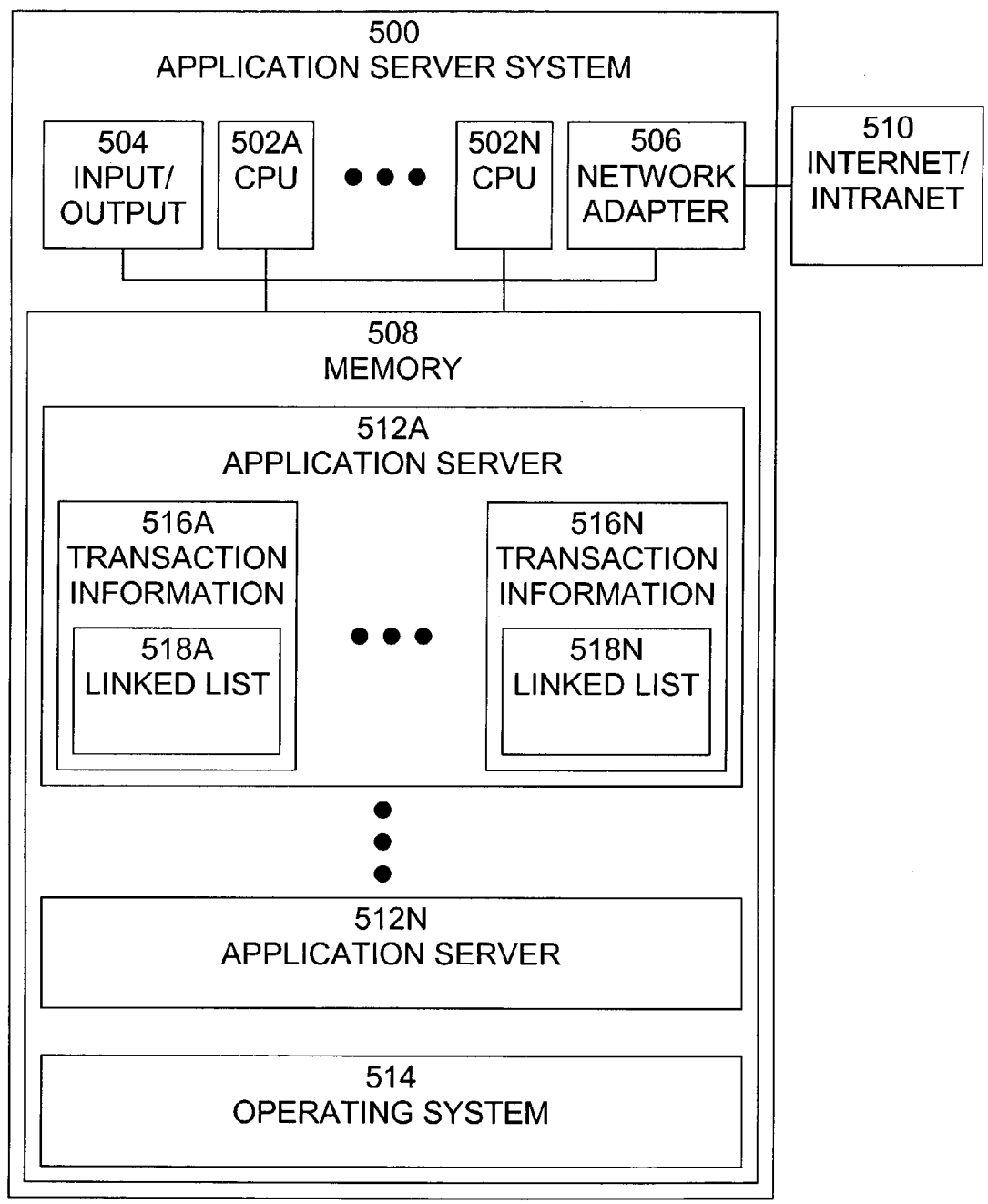
FIG. 5 is an exemplary block diagram of an application server system, in which one or more application servers may be implemented.

An exemplary block diagram of an application server system 500, in which one or more application servers may be implemented, is shown in FIG. 5. System 500 is typically a programmed general-purpose computer system, such as a personal computer, workstation, server system, and minicomputer or mainframe computer. System 500 includes one or more processors (CPUs) 502A–502N, input/output circuitry 504, network adapter 506, and memory 508. CPUs 502A–502N execute program instructions in order to carry out the functions of the present invention. Typically, CPUs 502A–502N are one or more microprocessors, such as an INTEL PENTIUM® processor. FIG. 5 illustrates an embodiment in which System 500 is implemented as a single multi-processor computer system, in which multiple processors 502A–502N share system resources, such as memory 508, input/output circuitry 504, and network adapter 506. However, the present invention also contemplates embodiments in which System 500 is implemented as a plurality of networked computer systems, which may be single-processor computer systems, multi-processor computer systems, or a mix thereof.

Input/output circuitry 504 provides the capability to input data to, or output data from, database/System 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces database/System 500 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of system 500. Memory 508 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 5, memory 508 includes a plurality of application servers 512A–N and operating system 514. Application servers 512A–N are software that handle application operations between user applications and backend servers. Application servers are typically used for complex transaction-based applications. Operating system 514 provides overall system functionality.

Each application server, such as application server 512A, includes a plurality of blocks of transaction information 516A–N. Each block of transaction information, such as transaction information block 516A, includes one or more linked list data structures, such as linked list 518A.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of managing transaction branches comprising the steps of:

beginning execution of a transaction on behalf of an application;

storing information relating to branches of the transaction in a data structure configured to store information for transactions being managed;

iterating over the data structure to identify branches of the transaction that are eligible for an action;

executing a first action for at least some branches of the transaction identified as eligible for an action;

applying a second action to branches of the transaction, if the first action returns an error; and modifying the data structure to reorder the location of the information relating to at least one of the at least some branches within the data structure, if the first action recurrently returns an error in a branch of the transaction.

2. The method of claim 1, wherein the transaction is executed using a two-phase transaction protocol.

3. The method of claim 2, wherein the step of storing information relating to branches of the transaction comprises the step of:

inserting at least one entry in the data structure, the entry including a information relating to a branch of the transaction.

4. The method of claim 1, wherein the information is reordered in the data structure so that serial execution is altered in a current or in a later iteration.

5. The method of claim 4, further comprising the step of: changing a state of the transaction.

6. The method of claim 5, wherein the step of changing the state of the transaction comprises the step of:

transitioning the state of the transaction to a "rolling back" state, if the state of the transaction is a "preparing" state.

7. The method of claim 6, further comprising the step of:

terminating processing of the transaction on behalf of the application, if all remaining branches in a linked list are branches on which no further progress can be made.

8. The method of claim 7, wherein the data structure comprises a list, an array, a vector, or a hash set.

9. The method of claim 8, wherein the list is a linked list.

10. The method of claim 4, further comprising the step of:

terminating processing of the transaction on behalf of the application, if all remaining branches in a linked list are branches on which no further progress can be made.

11. The method of claim 10, wherein the data structure comprises a list, an array, a vector, or a hash set.

12. The method of claim 11, wherein the list is a linked list.

13. A system for managing transaction branches comprising:

a processor operable to execute computer program instructions;

a memory operable to store computer program instructions executable by the processor; and computer program instructions stored in the memory and executable to perform the steps of:

beginning execution of a transaction on behalf of an application;

storing information relating to branches of the transaction in a data structure configured to store information for transactions being managed;

iterating over the data structure to identify branches of the transaction that are eligible for an action;

executing a first action for at least some branches of the transaction identified as eligible for an action;

applying a second action to branches of the transaction, if the first action returns an error; and modifying the data structure to reorder the location of the information relating to at least one of the at least some branches within the data structure. if the first action recurrently returns an error in a branch of the transaction.

14. The system of claim 13, wherein the transaction is executed using a two-phase transaction protocol.

15. The system of claim 14, wherein the step of storing information relating to branches of the transaction comprises the step of:

inserting at least one entry in the data structure, the entry including a information relating to a branch of the transaction.

16. The system of claim 11, wherein the information is reordered in the data structure so that serial execution is altered in a current or in a later iteration.

17. The system of claim 16, further comprising the step of:

changing a state of the transaction.

18. The system of claim 17, wherein the step of changing the state of the transaction comprises the step of:

transitioning the state of the transaction to a "rolling back" state, if the state of the transaction is a "preparing" state.

19. The system of claim 18, further comprising the step of:

terminating processing of the transaction on behalf of the application, if all remaining branches in a linked list are branches on which no further progress can be made.

20. The system of claim 19, wherein the data structure comprises a list, an array, a vector, or a hash set.

21. The system of claim 20, wherein the list is a linked list.

22. The system of claim 16, further comprising the step of:

terminating processing of the transaction on behalf of the application, if all remaining branches in a linked list are branches on which no further progress can be made.

23. The system of claim 22, wherein the data structure comprises a list, an array, a vector, or a hash set.

24. The system of claim 23, wherein the list is a linked list.

25. A computer program product for managing transaction branches comprising:

a computer readable recordable-type medium;

computer program instructions, recorded on the computer readable recordable-type medium, executable by a processor, for performing the steps of:

beginning execution of a transaction on behalf of an application;

storing information relating to branches of the transaction in a data structure configured to store information for transactions being managed;

iterating over the data structure to identify branches of the transaction that are eligible for an action;

executing a first action for at least some branches of the transaction identified as eligible for an action;

applying a second action to branches of the transaction, if the first action returns an error; and modifying the data structure to reorder the location of the information relating to at least one of the at least some branches within the data structure. if the first action recurrently returns an error in a branch of the transaction.

26. The method of claim 25, wherein the transaction is executed using a two-phase transaction protocol.

27. The method of claim 26, wherein the step of storing information relating to branches of the transaction comprises the step of:

inserting at least one entry in the data structure, the entry including a information relating to a branch of the transaction.

28. The method of claim 25, wherein the information is reordered in the data structure so that serial execution is altered in a current or in a later iteration.

29. The computer program product of claim 28, further comprising the step of:

changing a state of the transaction.

30. The computer program product of claim 29, wherein the step of changing the state of the transaction comprises the step of:

transitioning the state of the transaction to a "rolling back" state, if the state of the transaction is a "preparing" state.

31. The computer program product of claim 30, further comprising the step of:

terminating processing of the transaction on behalf of the application, if all remaining branches in a linked list are branches on which no further progress can be made.

32. The computer program product of claim 31, wherein the data structure comprises a list, an array, a vector, or a hash set.

33. The computer program product of claim 32, wherein the list is a linked list.

34. The method of claim 28, further comprising the step of:

terminating processing of the transaction on behalf of the application, if all remaining branches in a linked list are branches on which no further progress can be made.

35. The method of claim 29, wherein the data structure comprises a list, an array, a vector, or a hash set.

36. The method of claim 30, wherein the list is a linked list.

* * * * *